US012586970B2

(12) United States Patent
Yaoita

(10) Patent No.: US 12,586,970 B2
(45) Date of Patent: Mar. 24, 2026

(54) TERMINAL FITTING AND TERMINAL-EQUIPPED ELECTRIC WIRE

(71) Applicant: YAZAKI CORPORATION, Tokyo (JP)

(72) Inventor: Syunsuke Yaoita, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 355 days.

(21) Appl. No.: 18/398,142

(22) Filed: Dec. 28, 2023

(65) Prior Publication Data

US 2024/0250456 A1 Jul. 25, 2024

(30) Foreign Application Priority Data

Jan. 23, 2023 (JP) ................................. 2023-007760

(51) Int. Cl.
*H01R 43/02* (2006.01)
*H01R 11/12* (2006.01)

(52) U.S. Cl.
CPC ......... *H01R 43/0207* (2013.01); *H01R 11/12* (2013.01)

(58) Field of Classification Search
CPC ...... H01R 43/0207; H01R 4/023; H01R 4/18; H01R 11/12
USPC .................................................. 439/877, 874
See application file for complete search history.

(56) References Cited

U.S. PATENT DOCUMENTS

| | | | | |
|---|---|---|---|---|
| 4,795,380 A * | 1/1989 | Frantz | H01R 11/12 | 439/879 |
| 7,033,233 B2 * | 4/2006 | Fujimoto | B23H 11/006 | 439/874 |
| 9,466,892 B2 * | 10/2016 | Iio | H01R 43/0207 | |
| 10,971,878 B2 * | 4/2021 | Suzuki | H01R 43/0207 | |
| 11,205,860 B2 * | 12/2021 | Scharkowski | H01R 4/625 | |
| 2002/0162683 A1 | 11/2002 | Fujiwara | | |
| 2010/0003867 A1 * | 1/2010 | Lehmann | H01R 43/0207 | 228/115 |
| 2011/0042444 A1 * | 2/2011 | Ohnuma | H01R 4/023 | 228/110.1 |
| 2011/0062218 A1 * | 3/2011 | Ohnuma | B23K 20/106 | 228/110.1 |

(Continued)

FOREIGN PATENT DOCUMENTS

JP 2009231079 A * 10/2009
JP 2011018597 A * 1/2011

(Continued)

*Primary Examiner* — Marcus E Harcum
(74) *Attorney, Agent, or Firm* — KENEALY VAIDYA LLP

(57) ABSTRACT

A terminal fitting includes an ultrasonic bonding part that is ultrasonically bonded to a conductor part, and an electric connection part that is formed integrally with the ultrasonic bonding part and is electrically connected to a counterpart member. The ultrasonic bonding part includes a bottom wall extending along an axial direction of the electric wire, and a pair of side walls protruding from the bottom wall along a height direction, concave parts are provided at inner surfaces of the bottom wall and the pair of side walls, the inner surfaces facing the conductor part, and the concave parts at the pair of side walls are formed to be higher than a first height along the height direction of the conductor part after the ultrasonic bonding.

5 Claims, 2 Drawing Sheets

(56) References Cited

U.S. PATENT DOCUMENTS

| | | | | |
|---|---|---|---|---|
| 2012/0244759 A1* | 9/2012 | Tsuji | H01R 4/029 | 439/877 |
| 2014/0227916 A1* | 8/2014 | Kato | H01R 4/186 | 439/877 |
| 2014/0311797 A1* | 10/2014 | Numata | H02G 15/06 | 174/75 R |
| 2014/0311798 A1* | 10/2014 | Numata | H02G 15/06 | 174/75 R |
| 2014/0312097 A1* | 10/2014 | Miyazato | H01R 43/0207 | 228/1.1 |
| 2014/0353361 A1* | 12/2014 | Numata | H01R 43/0207 | 228/110.1 |
| 2015/0311623 A1* | 10/2015 | Naganishi | H01R 43/0484 | 439/589 |
| 2016/0199932 A1* | 7/2016 | Kern | H01R 4/187 | 439/874 |
| 2019/0165493 A1* | 5/2019 | Warashina | H01R 4/187 | |
| 2019/0356062 A1* | 11/2019 | Sato | H01R 4/029 | |
| 2020/0076093 A1* | 3/2020 | Randolph | H01R 4/18 | |
| 2020/0227839 A1* | 7/2020 | Tsuchiya | H01R 4/185 | |
| 2021/0376495 A1* | 12/2021 | Tanaka | H01R 4/185 | |

FOREIGN PATENT DOCUMENTS

| | | | |
|---|---|---|---|
| JP | 2015095317 | A * | 5/2015 |
| JP | 2017-4911 | A | 1/2017 |
| WO | 2002071563 | A1 | 9/2004 |

* cited by examiner

TERMINAL FITTING AND TERMINAL-EQUIPPED ELECTRIC WIRE

CROSS-REFERENCE TO RELATED APPLICATION(S)

The present application claims priority to and incorporates by reference the entire contents of Japanese Patent Application No. 2023-007760 filed in Japan on Jan. 23, 2023.

BACKGROUND OF THE INVENTION

1. Field of the Invention

The present invention relates to a terminal fitting and a terminal-equipped electric wire.

2. Description of the Related Art

One example of the technique regarding the conventional terminal fitting is disclosed in Japanese Patent Application Laid-open No. 2017-004911. This terminal fitting includes an ultrasonic bonding part that is ultrasonically bonded to a conductor part exposed from an end of an electric wire, and an electric connection part that is formed integrally with the ultrasonic bonding part and electrically connected to a counterpart member. In this terminal fitting, the ultrasonic bonding part includes a bottom wall and a pair of side walls intersecting with the bottom wall, and the bottom wall includes a concave part for accommodating an insulating covering part of the electric wire that is melted at the ultrasonic bonding.

By the way, there is room for further improvement in the aforementioned terminal fitting according to Japanese Patent Application Laid-open No. 2017-004911, for example, in terms of improving the bonding strength to the electric wire.

SUMMARY OF THE INVENTION

The present invention has been made in view of the above, and it is an object of the present invention to provide a terminal fitting and a terminal-equipped electric wire in which bonding strength to an electric wire can be improved.

In order to achieve the above mentioned object, a terminal fitting according to one aspect of the present invention includes an ultrasonic bonding part that is ultrasonically bonded to a conductor part exposed from an end of an electric wire; and an electric connection part that is formed integrally with the ultrasonic bonding part and is electrically connected to a counterpart member, wherein the ultrasonic bonding part includes a bottom wall extending along an axial direction of the electric wire, and a pair of side walls protruding from the bottom wall along a height direction intersecting with the axial direction, concave parts are provided at inner surfaces of the bottom wall and the pair of side walls, the inner surfaces facing the conductor part, and the concave parts at the pair of side walls are formed to be higher than at least a first height along the height direction of the conductor part after the ultrasonic bonding.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of the present invention will hereinafter be described in detail based on the drawings. The present invention is not limited by the following embodiment. Moreover, the components in the following embodiment include those that can be replaced and easily conceived by persons who are skilled in the art, or those that are substantially the same. In this specification, ordinal numbers are used only to distinguish parts, components, sites, locations, directions, and the like, and do not indicate the order or priority.

Embodiment

Figure 1:
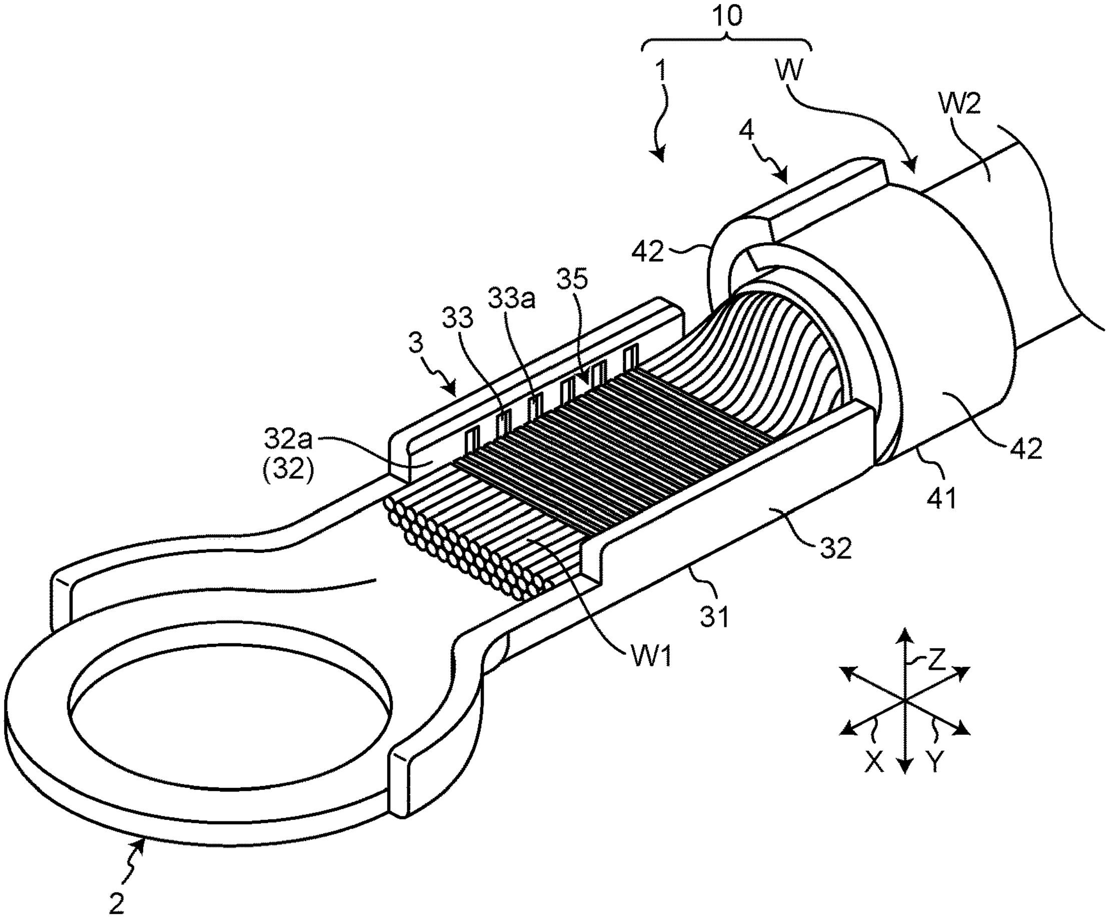
FIG. 1 is a perspective view illustrating a terminal-equipped electric wire in which a terminal fitting according to an embodiment is used, expressing the state after ultrasonic bonding.

FIG. 1 is a perspective view illustrating a terminal-equipped electric wire 10 in which a terminal fitting 1 according to an embodiment is used, expressing the state after ultrasonic bonding. The terminal-equipped electric wire 10 according to this embodiment illustrated in FIG. 1 is used in a wire harness or the like used in vehicles. Here, one example of the wire harness is formed in a manner that a plurality of electric wires W used for power supply or signal communication are made into a bundle as an assembly component and the electric wires W are connected to each device mounted on a vehicle through a connector or the like, thereby connecting between the devices.

The terminal-equipped electric wire 10 according to this embodiment includes the electric wire W and the terminal fitting 1 that is ultrasonically bonded to an end of the electric wire W. In the terminal-equipped electric wire 10 according to this embodiment, concave parts 33 described below are provided in an ultrasonic bonding part 3 of the terminal fitting 1 and the concave part 33 is provided across a bottom wall 31 and a pair of side walls 32 of the ultrasonic bonding part 3; thus, the bonding strength between the terminal fitting 1 and the electric wire W is improved. Each structure of the terminal-equipped electric wire 10 is described in detail below with reference to each drawing.

In the following description, of first, second, and third directions that intersect with each other, the first direction is referred to as an "axial direction X," the second direction as a "width direction Y," and the third direction as a "height direction Z". Here, the axial direction X, the width direction Y, and the height direction Z are substantially orthogonal to each other. The axial direction X typically corresponds to a direction along the axis of the electric wire W on which the terminal fitting 1 is installed, an extending direction where the electric wire W extends, and a longitudinal direction of the terminal fitting 1. The height direction Z typically corresponds to a thickness direction (up-down direction) of the terminal fitting 1. The width direction Y corresponds to an intersecting direction that intersects with the axial direction X and the height direction Z. The directions used in the following description indicate those in a state where the electric wire W is assembled to the terminal fitting 1 unless otherwise stated.

The electric wire W includes, for example, a plurality of conductor parts W1 that have a conductive property and have a linear shape, and an insulating covering part W2 that has an insulating property and covers an outer side of the conductor parts W1. The electric wire W is an insulating electric wire in which the conductor parts W1 are covered with the insulating covering part W2. The conductor part W1 in this embodiment is a core wire formed by binding a plurality of conductive metal strands and this conductor part W1 may alternatively be a twisted core wire made by twisting the metal strands together.

The insulating covering part W2 is an electric wire cover that covers an outer peripheral side of the conductor part W1. The insulating covering part W2 is, for example, formed by extruding and molding an insulating resin material (PP, PVC, cross-linked PE, etc. The material is selected suitably in consideration of abrasion resistance, chemical resistance, heat resistance, or the like). The electric wire W extends linearly along the axial direction X and is formed so as to extend with substantially the same diameter with respect to the axial direction (extending direction).

The cross-sectional shape of the conductor part W1 of the electric wire W (the cross-sectional shape in a direction intersecting with the axial direction X) is approximately circular, and the cross-sectional shape of the insulating covering part W2 is approximately annular; thus, the cross-sectional shape of the whole is approximately circular. In at least one end of the conductor part W1 of the electric wire W, the insulating covering part W2 is stripped off and the one end of the conductor part W1 is exposed from the insulating covering part W2. To this exposed end of the conductor part W1, the terminal fitting 1 is provided.

The terminal fitting 1 is a terminal member to which the electric wire W is electrically connected and to which a counterpart member with conductivity is connected. The terminal fitting 1 includes, for example, an electric connection part 2, an ultrasonic bonding part 3, and an electric wire crimp part 4. The electric connection part 2, the ultrasonic bonding part 3, and the electric wire crimp part 4 are integrally formed of a metal member with conductivity.

Specifically, the terminal fitting 1 is formed in a manner that a piece of sheet metal is molded into a shape corresponding to each part of the electric connection part 2, the ultrasonic bonding part 3, the electric wire crimp part 4, or the like by various processing such as punching, pressing, or bending, so that the respective parts are integrally formed three-dimensionally. In the terminal fitting 1, the electric connection part 2, the ultrasonic bonding part 3, the electric wire crimp part 4 are arranged in this order and coupled to each other from one side to the other side along the axial direction X.

The electric connection part 2 is a part that is electrically connected to the counterpart member. The counterpart member is, for example, a grounding member or the like. That is to say, the electric connection part 2 in this embodiment is configured as a so-called round terminal (LA terminal) that is fastened to a grounding member or the like that is the counterpart member. The counterpart member is not limited to this example and may be, for example, a male or female counterpart terminal or the like. In this case, the electric connection part 2 is configured as a terminal connection part that is electrically connected to the counterpart terminal, which is the counterpart member.

The ultrasonic bonding part 3 is a part to which the electric wire W is connected, and that electrically connects the end of the electric wire W to the terminal fitting 1. The ultrasonic bonding part 3 is ultrasonically bonded to the conductor part W1 exposed at the end of the electric wire W. The ultrasonic bonding part 3 includes, for example, a bottom wall 31 and a pair of side walls 32 that intersect with the bottom wall 31. The ultrasonic bonding part 3 is ultrasonically bonded to the conductor part W1 of the electric wire W with the conductor part W1 inserted in an insertion space part 35 between the bottom wall 31 and the pair of side walls 32.

The ultrasonic bonding part 3 exists between the electric connection part 2 and the electric wire crimp part 4, and couples the electric connection part 2 and the electric wire crimp part 4 to each other. In the terminal fitting 1, the electric connection part 2 and the electric wire crimp part 4 are connected through the ultrasonic bonding part 3, and the electric connection part 2 and the conductor part W1 of the electric wire W are electrically connected and become conductive through the ultrasonic bonding part 3.

The electric wire crimp part 4 is a part that crimps the terminal fitting 1 and the insulating covering part W2 at the end of the electric wire W. The electric wire crimp part 4 includes, for example, a bottom wall 41 with a flat plate shape extending along the axial direction X, and a pair of barrel piece parts 42 intersecting with the bottom wall 41. The electric wire crimp part 4 is caulked and crimped to the insulating covering part W2 of the electric wire W by the bottom wall 41 and the pair of barrel piece parts 42.

The pair of barrel piece parts 42 are parts that are formed extending in a strip shape from the bottom wall 41 to each side of the width direction Y in the electric wire crimp part 4, and that wrap the insulating covering part W2 of the electric wire W between the bottom wall 41 and the pair of barrel piece parts 42, and are caulked and crimped. The pair of barrel piece parts 42 are parts that serve as side walls of the U-shaped electric wire crimp part 4 in a state before the electric wire crimp part 4 is subjected to a crimping process (see FIG. 3). One of the pair of barrel piece parts 42 extends from the bottom wall 41 to one side of the width direction Y, and the other extends from the bottom wall 41 to the other side of the width direction Y.

The length of the pair of barrel piece parts 42 in this embodiment from the root on the bottom wall 41 side to the tip is set so that the pair of barrel piece parts 42 overlap with each other when the pair of barrel piece parts 42 are wound around the insulating covering part W2, caulked, and crimped. In the electric wire crimp part 4, the bottom wall 41 and the pair of barrel piece parts 42 wrap the outer side of the insulating covering part W2 of the electric wire W disposed between the pair of barrel piece parts 42, and are caulked and crimped with respect to the insulating covering part W2.

In the terminal-equipped electric wire 10 configured as described above, the ultrasonic bonding part 3 and the conductor part W1 are ultrasonically bonded and the electric wire crimp part 4 and the insulating covering part W2 are crimped, so that the terminal fitting 1 is fixed to the end of the electric wire W. In the terminal-equipped electric wire 10, the electric connection part 2 of the terminal fitting 1 is electrically connected to the counterpart member.

Figure 2:
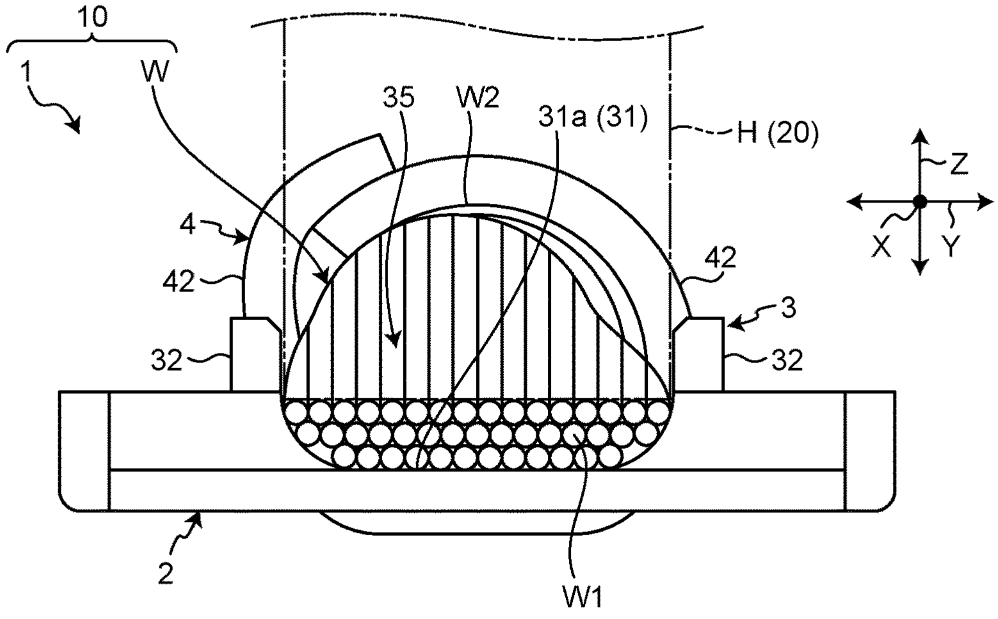
FIG. 2 is a front view illustrating the terminal-equipped electric wire in which the terminal fitting according to the embodiment is used.

FIG. 2 is a front view of the terminal-equipped electric wire 10, in which the terminal-equipped electric wire 10 in FIG. 1 is viewed from one side in the axial direction X. As illustrated in FIG. 2, the conductor part W1 of the electric wire W and the ultrasonic bonding part 3 are ultrasonically bonded by an ultrasonic bonding apparatus 20 including, for example, a horn H, and an anvil, a press die, and a press molding machine and the like, which are not illustrated.

Specifically, the conductor part W1 of the electric wire W is first press-molded by the press die and the press molding machine in accordance with the insertion width of the insertion space part 35 along the width direction Y in the ultrasonic bonding part 3. The press-molded conductor part W1 is inserted into the insertion space part 35 between the pair of side walls 32 and is ultrasonically bonded to the ultrasonic bonding part 3 while being pressurized from one side in the height direction Z by the horn H.

The press die has a groove part for regulating the width of the conductor part W1. The groove part has the width in accordance with the insertion width of the insertion space part 35, and by fitting the conductor part W1 into the groove part, the width of the conductor part W1 is regulated in accordance with the insertion width of the insertion space part 35. The press molding machine press-molds the conductor part W1, which is regulated by the press die, into a predetermined flat plate shape by pressurizing from one side of the height direction Z.

In the state where the press-molded conductor part W1 is inserted into the insertion space part 35, ultrasonic vibration is applied while the conductor part W1 is pressurized between the horn H and the anvil, which is not illustrated, to make the conductor part W1 and the ultrasonic bonding part 3 slide relative to each other; thus, the ultrasonic bonding is performed. A contact part of the anvil with the ultrasonic bonding part 3 is shaped to match the shape of the ultrasonic bonding part 3, which ensures the high adhesion between the conductor part W1 of the electric wire W and the ultrasonic bonding part 3, resulting in the suitable bonding performance.

Figure 3:
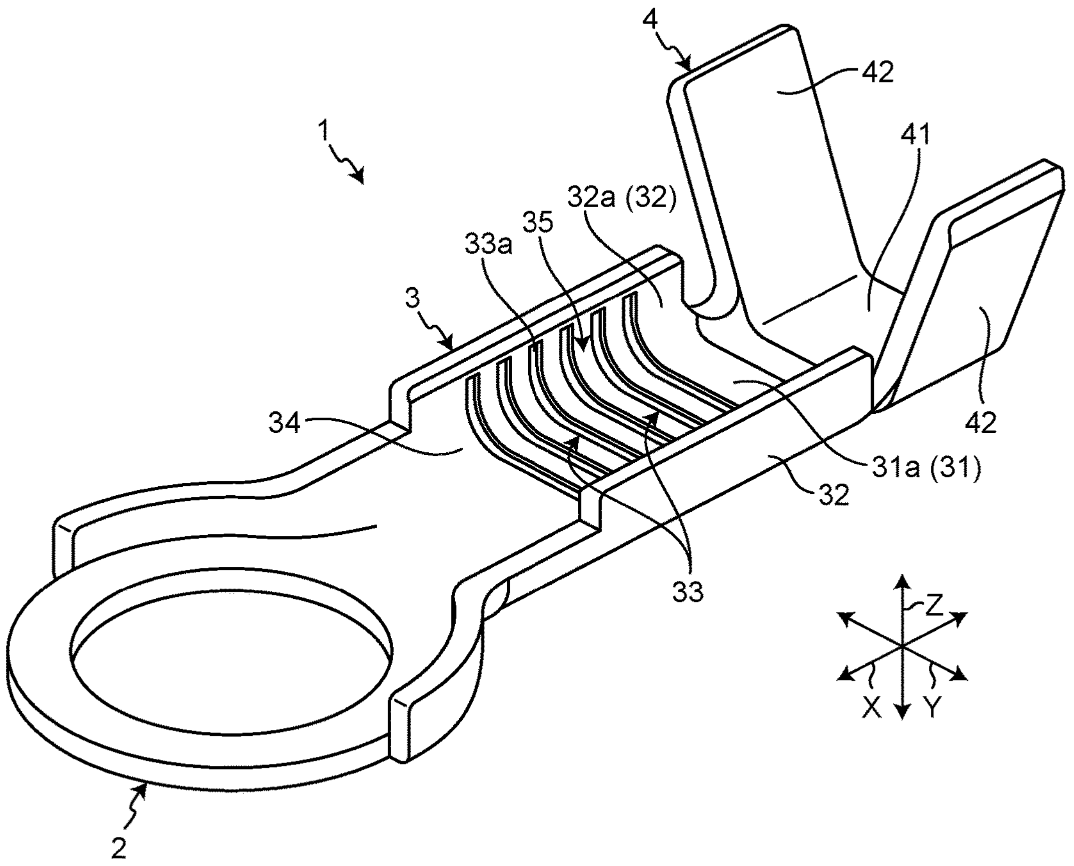
FIG. 3 is a perspective view illustrating the terminal fitting according to the embodiment.

FIG. 3 is a perspective view of the terminal fitting 1, illustrating the state before the ultrasonic bonding and before the crimping process. As illustrated in FIG. 3, the cross-sectional shape of the ultrasonic bonding part 3 that intersects with the axial direction X is substantially U-shaped by the bottom wall 31 and the pair of side walls 32, for example. The bottom wall 31 and the pair of side walls 32 are structures for defining the insertion space part 35 into which the conductor part W1 (see FIG. 4) of the electric wire W described above is inserted.

The bottom wall 31 is formed to have a flat plate shape, and extends along the axial direction X. The pair of side walls 32 are formed protruding along the height direction Z from both-end parts of the bottom wall 31 in the width direction Y and extend along the axial direction X. In the ultrasonic bonding part 3, the bottom wall 31 and the pair of side walls 32 are integrally formed and the space part surrounded by the bottom wall 31 and the pair of side walls 32 functions as the insertion space part 35 described above. A corner part 34 between the bottom wall 31 and the pair of side walls 32 in the insertion space part 35 is formed, for example, to have an arcuate surface shape extending along an outer peripheral surface of the conductor part W1.

In the ultrasonic bonding part 3 configured as described above, the conductor part W1 of the electric wire W, which is press-molded into a predetermined flat plate shape by the press die and the press molding machine described above, is inserted into the insertion space part 35 formed by the bottom wall 31 and the pair of side walls 32. The insulating covering part W2 of the electric wire W is inserted into the insertion space part formed by the bottom wall 41 and the pair of barrel piece parts 42 in the electric wire crimp part 4.

Here, in this embodiment, the ultrasonic bonding part 3 has a plurality of the concave parts 33 provided at inner surfaces 31*a* and 32*a* of the bottom wall 31 and the pair of side walls 32, the inner surfaces 31*a* and 32*a* facing the conductor part W1. A plurality of the concave parts 33 is recessed from the inner surfaces 31*a* and 32*a* of the bottom wall 31 and the pair of side walls 32 along a direction away from the conductor part W1, that is, the height direction Z or the width direction Y, and are open toward the conductor part W1. In this embodiment, a plurality of the concave parts 33 is formed in the form of slit grooves that extend horizontally long along the width direction Y, for example.

A plurality of the concave parts 33 is provided, for example, extending across the bottom wall 31 and the pair of side walls 32. That is to say, a plurality of the concave parts 33 includes both-end parts 33*a* extending along the height direction Z in the pair of side walls 32, and a central part connected to the both-end parts 33*a* and extending along the width direction Y in the bottom wall 31. A plurality of the concave parts 33 has the function of increasing the contact area between the bottom wall 31 and the pair of side walls 32, and the conductor part W1 by the bottom surface and the pair of side surfaces of the concave parts 33 recessed along the height direction Z or the width direction Y.

Figure 4:
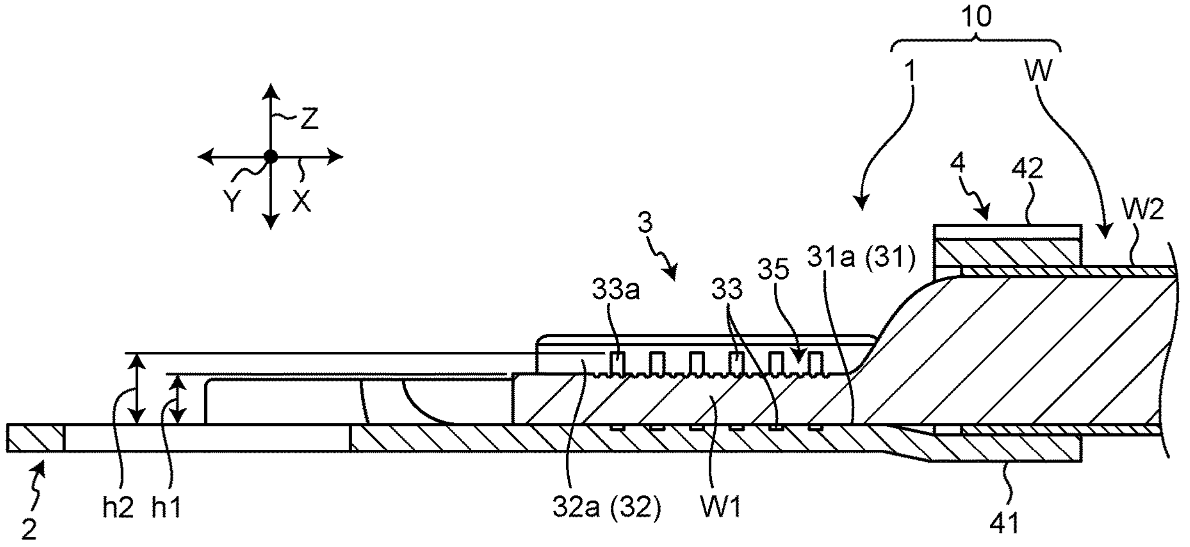
FIG. 4 is a cross-sectional view illustrating the terminal-equipped electric wire in which the terminal fitting according to the embodiment is used, expressing the state after the ultrasonic bonding.

FIG. 4 is a cross-sectional view of the terminal-equipped electric wire 10, illustrating the state after the ultrasonic bonding. As illustrated in FIG. 4, a plurality of the concave parts 33 is spaced apart from each other in the axial direction X in the insertion space part 35. In this embodiment, a plurality of the concave parts 33 has the same shape. In other words, a plurality of the concave parts 33 is aligned in the axial direction X in the insertion space part 35.

In this embodiment, the concave parts 33 in the pair of side walls 32 are formed to be higher than at least a first height h1 along the height direction Z of the conductor part W1 after the ultrasonic bonding. Specifically, the concave parts 33 are formed so that a second height h2 along the height direction Z of the both-end parts 33*a* of the concave parts 33 is higher than the first height h1. In other words, the concave parts 33 extend so as to exist on one side of the height direction Z (upper side) above the first height h1 of the conductor part W1.

In this embodiment, the concave parts 33 are formed to be higher than the first height h1 along the height direction Z of the conductor part W1 after the ultrasonic bonding; however, the structure is not limited to this example. In another example, the concave parts 33 are preferably formed to be higher than the height along the height direction Z of the conductor part W1 before the ultrasonic bonding, specifically, higher than a third height (not illustrated) along the height direction Z of the conductor part W1 after being press-molded into a predetermined flat plate shape by the press die and the press molding machine described above.

In this embodiment, the concave parts 33 are provided to extend across the bottom wall 31 and the pair of side walls 32; however, the structure is not limited to this example. In another example, the concave parts 33 may be provided separately for the bottom wall 31 and the pair of side walls 32. In other words, the concave parts 33 may be provided intermittently in the width direction Y, instead of being provided continuously across the bottom wall 31 and the pair of side walls 32. It is preferable that the concave parts 33 of the pair of side walls 32 extend so as to exist on one side of the height direction Z (upper side) relative to the range where the pair of side walls 32 and the conductor part W1 are in contact with each other in the insertion space part 35 at the ultrasonic bonding, for example.

Here, if the concave parts 33 are provided only on the bottom wall 31 inside the insertion space part 35, there is a risk that the bonding strength in the width direction Y perpendicular to the height direction Z where the conductor part W1 is pressed by the aforementioned horn H (see FIG. 2) becomes relatively weak, compared to the bonding strength in the height direction Z where the conductor part W1 is pressed by the horn H. As the outer diameter or the number of conductor parts W1 to be bonded increases, the range where the pair of side walls 32 and the conductor parts W1 are in contact inside the insertion space part 35 in the height direction Z increases; thus, the necessary boning strength may not be obtained in this case.

In this regard, according to this embodiment, since the concave parts 33 are provided in the bottom wall 31 and the pair of side walls 32 in the insertion space part 35, for example, the concave parts 33 can increase the contact area between the pair of side walls 32 and the conductor part W1. This makes it easier to generate friction along with the relative sliding between the conductor part W1 and the pair of side walls 32 at the ultrasonic bonding and promote the plastic flow, resulting in that the bonding strength in the width direction Y perpendicular to the height direction Z where the conductor part W1 is pressed by the horn H can be secured easily.

As described above, the terminal fitting 1 and the terminal-equipped electric wire 10 according to this embodiment include the concave parts 33 provided at the inner surfaces 31*a* and 32*a* of the bottom wall 31 and the pair of side walls 32 in the ultrasonic bonding part 3, and the concave parts 33 of the pair of side walls 32 are formed to be higher than at least the first height h1 along the height direction Z of the conductor part W1 after the ultrasonic bonding. In the terminal fitting 1 and the terminal-equipped electric wire 10 having the aforementioned structure, for example, the contact area between the bottom wall 31 and the pair of side walls 32, and the conductor part W1 of the electric wire W is increased by the concave parts 33 and moreover, the friction occurs more easily due to the relative sliding between the bottom wall 31 and the pair of side walls 32, and the conductor part W1 at the ultrasonic bonding and the plastic flow is promoted. As a result, the terminal fitting 1 and the terminal-equipped electric wire 10 can improve the bonding strength to the electric wire W.

In the terminal fitting 1 and the terminal-equipped electric wire 10 according to this embodiment, the concave parts 33 are provided extending across the bottom wall 31 and the pair of side walls 32, and the second height h2 along the height direction Z of the both-end parts 33*a* of the concave parts 33 is higher than the first height h1. For example, in comparison to the case in which the concave parts 33 are provided intermittently instead of being provided continuously across the bottom wall 31 and the pair of side walls 32, in other words, the case in which the concave parts 33 are provided separately for the bottom wall 31 and the pair of side walls 32, the aforementioned structure of the terminal fitting 1 and the terminal-equipped electric wire 10 can increase further the bonding strength to the electric wire W because the contact area between the bottom wall 31 and the pair of side walls 32, and the conductor part W1 increases, or can reduce the time and effort, cost, and the like required for manufacturing the concave parts 33 and even the terminal fitting 1.

In the terminal fitting 1 and the terminal-equipped electric wire 10 according to this embodiment, the bottom wall 31 and the pair of side walls 32 include a plurality of the concave parts 33 spaced apart from each other in the axial direction X. In the terminal fitting 1 and the terminal-equipped electric wire 10 having the aforementioned structure, for example, the contact area between the bottom wall 31 and the pair of side walls 32, and the conductor part W1 is increased by a plurality of the concave parts 33; therefore, the friction occurs more easily due to the relative sliding between the bottom wall 31 and the pair of side walls 32, and the conductor part W1 at the ultrasonic bonding and additionally, the bonding strength between the terminal fitting 1 and the electric wire W can be enhanced.

The embodiment of the present invention has been described above; however, the aforementioned embodiment is one example and is not intended to limit the scope of the invention. The above embodiment can be implemented in various other forms, and various omissions, substitutions, combinations, and changes can be made without departing from the gist of the invention. In addition, each configuration, shape, and other specifications (structure, type, direction, form, size, length, width, thickness, height, number, arrangement, position, material, etc.) can be changed as needed.

In the terminal fitting and the terminal-equipped electric wire according to the present embodiment, the concave parts are provided at the inner surfaces of the bottom wall and the pair of side walls of the ultrasonic bonding part, and the concave parts at the pair of side walls are formed to be higher than at least the first height along the height direction of the conductor part after the ultrasonic bonding. In the terminal fitting and the terminal-equipped electric wire having the aforementioned structure, for example, the contact area between the bottom wall and the pair of side walls, and the conductor part of the electric wire is increased by the concave parts and moreover, the friction occurs more easily due to the relative sliding between the bottom wall and the pair of side walls, and the conductor part at the ultrasonic bonding and the plastic flow is promoted. As a result, the terminal fitting and the terminal-equipped electric wire can obtain the effect that the bonding strength to the electric wire can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal fitting comprising:

an ultrasonic bonding part that is ultrasonically bonded to a conductor part exposed from an end of an electric wire; and an electric connection part that is formed integrally with the ultrasonic bonding part and is electrically connected to a counterpart member, wherein the ultrasonic bonding part includes a bottom wall extending along an axial direction of the electric wire, and a pair of side walls protruding from the bottom wall along a height direction intersecting with the axial direction, concave parts are provided at inner surfaces of the bottom wall and the pair of side walls, the inner surfaces facing the conductor part, and the concave parts at the pair of side walls are formed to be higher than at least a first height along the height direction of the conductor part after the ultrasonic bonding.

2. The terminal fitting according to claim 1, wherein the concave parts are provided extending across the bottom wall and the pair of side walls, and a second height along the height direction of both-end parts of the concave part is higher than the first height.

3. The terminal fitting according to claim 1, wherein the concave parts are provided and spaced apart from each other in the axial direction at the bottom wall and the pair of side walls.

4. The terminal fitting according to claim 2, wherein the concave parts are provided and spaced apart from each other in the axial direction at the bottom wall and the pair of side walls.

5. A terminal-equipped electric wire comprising:

an electric wire; and a terminal fitting including an ultrasonic bonding part that is ultrasonically bonded to a conductor part exposed from an end of the electric wire, and an electric connection part that is formed integrally with the ultrasonic bonding part and is electrically connected to a counterpart member, wherein the ultrasonic bonding part includes a bottom wall extending along an axial direction of the electric wire, and a pair of side walls protruding from the bottom wall along a height direction intersecting with the axial direction, concave parts are provided at inner surfaces of the bottom wall and the pair of side walls, the inner surfaces facing the conductor part, and the concave parts at the pair of side walls are formed to be higher than at least a first height along the height direction of the conductor part after the ultrasonic bonding.

* * * * *